(12) United States Patent
Visscher

(10) Patent No.: US 9,511,639 B2
(45) Date of Patent: Dec. 6, 2016

(54) VEHICLE DRIVE UNIT AND REMOTELY CONTROLLABLE VEHICLE THEREWITH

(71) Applicant: Ontario Drive and Gear, Ltd., New Hamburg (CA)

(72) Inventor: Peter Visscher, Lakeside (CA)

(73) Assignee: Ontario Drive and Gear, Ltd., New Hamburg (CA)

( * ) Notice: Subject to any disclaimer, the term of this patent is extended or adjusted under 35 U.S.C. 154(b) by 0 days.

(21) Appl. No.: 14/627,465

(22) Filed: Feb. 20, 2015

(65) Prior Publication Data

US 2015/0258868 A1 Sep. 17, 2015

Related U.S. Application Data

(60) Provisional application No. 61/942,610, filed on Feb. 20, 2014.

(51) Int. Cl.
| | |
|---|---|
| *B60F 3/00* | (2006.01) |
| *B60K 1/00* | (2006.01) |
| *B60G 21/045* | (2006.01) |
| *B60K 17/342* | (2006.01) |
| *B60G 1/04* | (2006.01) |
| *B60G 5/02* | (2006.01) |
| *B60G 21/05* | (2006.01) |

(52) U.S. Cl.
CPC .............. *B60F 3/0007* (2013.01); *B60G 1/04* (2013.01); *B60G 5/02* (2013.01); *B60G 21/045* (2013.01); *B60G 21/05* (2013.01); *B60K 1/00* (2013.01); *B60K 17/342* (2013.01); *B60G 2200/422* (2013.01); *B60G 2204/421* (2013.01); *B60G 2204/8102* (2013.01); *B60G 2204/8302* (2013.01); *B60G 2204/8306* (2013.01); *B60G 2300/07* (2013.01); *B60G 2300/28* (2013.01); *B60G 2300/50* (2013.01); *B60Y 2200/60* (2013.01)

(58) Field of Classification Search
CPC ........................................................ B60F 3/00
See application file for complete search history.

(56) References Cited

U.S. PATENT DOCUMENTS

| | | | |
|---|---|---|---|
| 5,775,226 A | * | 7/1998 | Futami ................... B63G 8/001 104/139 |
| 6,318,483 B1 | | 11/2001 | Garrett et al. |
| 7,478,817 B1 | | 1/2009 | Carrier |
| 8,317,555 B2 | | 11/2012 | Jacobsen et al. |
| 8,540,040 B2 | | 9/2013 | Simula et al. |
| 8,548,646 B1 | | 10/2013 | Gariepy et al. |
| 8,588,970 B2 | | 11/2013 | Fletcher et al. |
| 2008/0300722 A1 | | 12/2008 | Dudek et al. |

(Continued)

*Primary Examiner* — Stephen Avila
(74) *Attorney, Agent, or Firm* — Brunet & Co. Ltd.; Robert A. H. Brunet

(57) ABSTRACT

A vehicle drive unit and land vehicle comprising the drive unit are disclosed. Each drive unit comprises a pair of longitudinally aligned and longitudinally spaced apart ground wheels. The land vehicle comprises a pair of drive units on opposite sides thereof. The drive units comprise an electric motor for powering the pair of wheels and a gear drive assembly comprising structure for disengaging the electric motor from the ground wheels. The drive units may be remotely controllable, may be water-tight and may be floatable. The vehicle comprising the drive unit may be amphibious.

23 Claims, 14 Drawing Sheets

(56) References Cited

U.S. PATENT DOCUMENTS

2009/0314554 A1* 12/2009 Couture ............... B25J 5/005
                                                      180/8.7
2012/0185129 A1   7/2012 Carrier

* cited by examiner

VEHICLE DRIVE UNIT AND REMOTELY CONTROLLABLE VEHICLE THEREWITH

CROSS-REFERENCE TO RELATED APPLICATIONS

This application claims the benefit of U.S. patent application Ser. No. 61/942,610, filed Feb. 20, 2014, which is incorporated herein by reference.

TECHNICAL FIELD

This disclosure relates to vehicle drive units for land vehicles. More particularly, it relates to modular vehicle drive units comprising a pair of wheels that are longitudinally aligned and longitudinally spaced apart. Also disclosed are land vehicles comprising at least a pair of the modular vehicle drive units. Also disclosed are land vehicles that are remotely controllable and are optionally amphibious.

BACKGROUND

Known land vehicles suffer from a variety of problems making them less than perfectly suited for a variety of applications, such as: agricultural work; mining and geological work; exploration or mapping of remote areas; academic research and the like. In particular, known land vehicles suffer from the problems of not having robust drive units capable of: being modular; being configurable in a variety of ways to form a variety of land vehicles; being readily replaceable (for example, for maintenance purposes); having ease of connectivity to a vehicle electric power source; being water-tight and optionally of floating; being readily controllable (for example, remotely); having structure for readily disconnecting an electric drive motor from ground engaging wheels; having ground engaging wheels capable of propelling a vehicle comprising the drive unit on water as well as land, etc. In addition, and in some instances as a result of the foregoing, known land vehicles suffer from the problems of: lack of robust suspension systems (for example, for traversing uneven terrain or large obstacles); carrying instrument payloads, particularly in a well-sealed environment and with ease of installation and removal from the vehicle (or drive unit); being amphibious; being remotely controllable; being skid-steerable (by differential movement of wheels on opposite sides of the vehicle); having a single electrical power source for a plurality of vehicle drive units; being towable, etc.

There remains a need for improved land vehicles and vehicle drive units addressing some or all of the aforementioned problems.

SUMMARY

There is provided a vehicle drive unit comprising: a pair of longitudinally aligned and longitudinally spaced apart ground wheels; an electric motor operatively coupled to the pair of wheels by a gear drive assembly; and, a housing enclosing the gear drive and motor to which the pair of wheels is operatively mounted.

There is further provided a land vehicle comprising: a vehicle body; a pair of drive units pivotally attached on opposite sides of the vehicle body, each drive unit comprising a pair of longitudinally aligned and longitudinally spaced apart ground wheels, an electric motor operatively coupled to the pair of wheels by a gear drive assembly, a housing enclosing the gear drive and motor to which the pair of wheels is operatively mounted, and structure configured to pivotally mount the drive unit to the vehicle located on the housing between the pair of wheels; an electrical power supply; and, remote control structure for the vehicle configured to permit differential operation of the drive units.

Further features will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DETAILED DESCRIPTION

Figure 1:
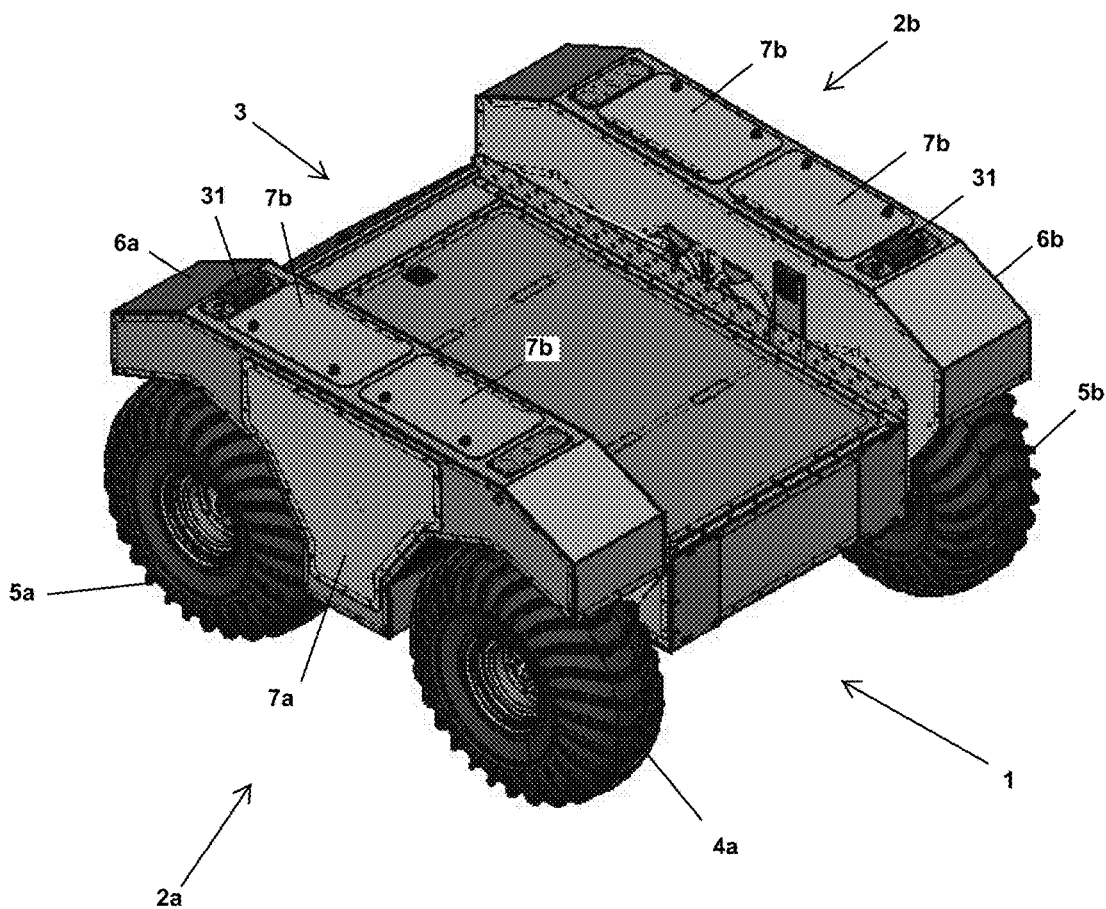
FIG. 1 is a perspective view of a land vehicle comprising a pair of vehicle drive units.

With reference to FIG. 1, a land vehicle 1 comprises a right side 2a and left side 2b vehicle drive unit pivotally attached on either side of a central vehicle body 3. Each vehicle drive unit 2a, 2b comprises a first ground wheel 4a, 4b, and a second ground wheel 5a, 5b. It can be seen that the right side vehicle drive unit 2a has first ground wheel 4a at the front of the vehicle 1 and second ground wheel 5b at a rear of the vehicle 1. Left side drive unit 2b has second ground wheel 5b at a front of the vehicle 1 and first ground wheel 4a (not shown in FIG. 1) at a rear of the vehicle 1. Thus, the right side 2a and left side 2b vehicle drive units are interchangeable with one another. This reduces the number of different drive units required to configure a vehicle 1, simplifies maintenance of vehicles, and reduces overall complexity of manufacturing.

Each drive unit 2a, 2b comprises a housing, 6a, 6b, to which the first wheels 4a, 4b and second wheels 5a, 5b are mounted. Side access hatches 7a are provided on a side of each drive unit 2a, 2b and top access hatches 7b are provided on a top of each drive unit. Side access hatches 7a permit access to interior drive components of the vehicle drive units 2a, 2b, whereas the top access hatches 7b permit access to compartments of an interior of the drive units configured for housing vehicle payloads. These payloads may comprise such items as electronic instrumentation, operator manuals, tools, spare parts, or the like. The housings 6a, 6b are configured to be watertight; thus, the side access hatches 7a and top access hatches 7b are sealed. Also provided atop each drive unit is an optional watertight radio transceiver unit 31, which is used to provide instructions to each drive unit for remote control of the drive unit, as will be further described hereinafter. In an alternative embodiment, individual radio transceiver units 31 may be replaced by a single radio transceiver unit located in the body 3 of the vehicle 1.

Figure 2:
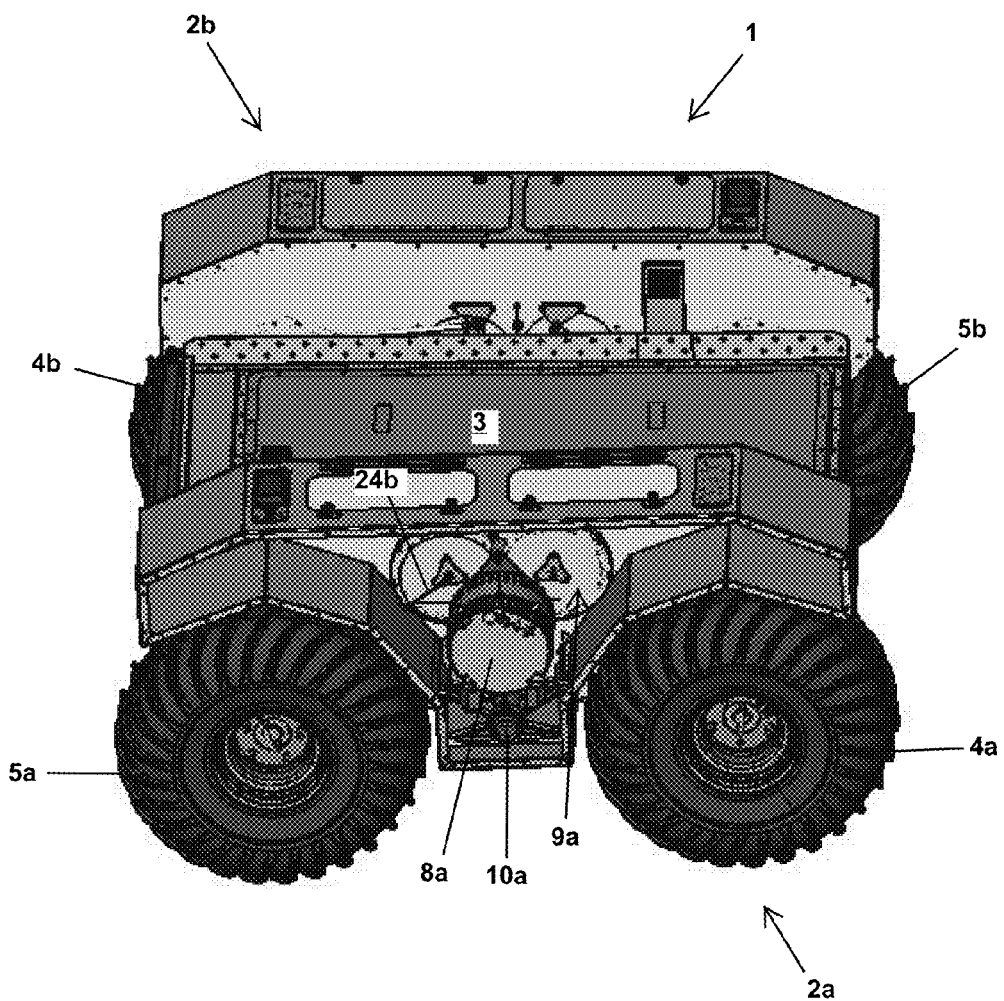
FIG. 2 is another perspective view of the land vehicle of FIG. 1 showing an interior of a drive unit.
Figure 3:
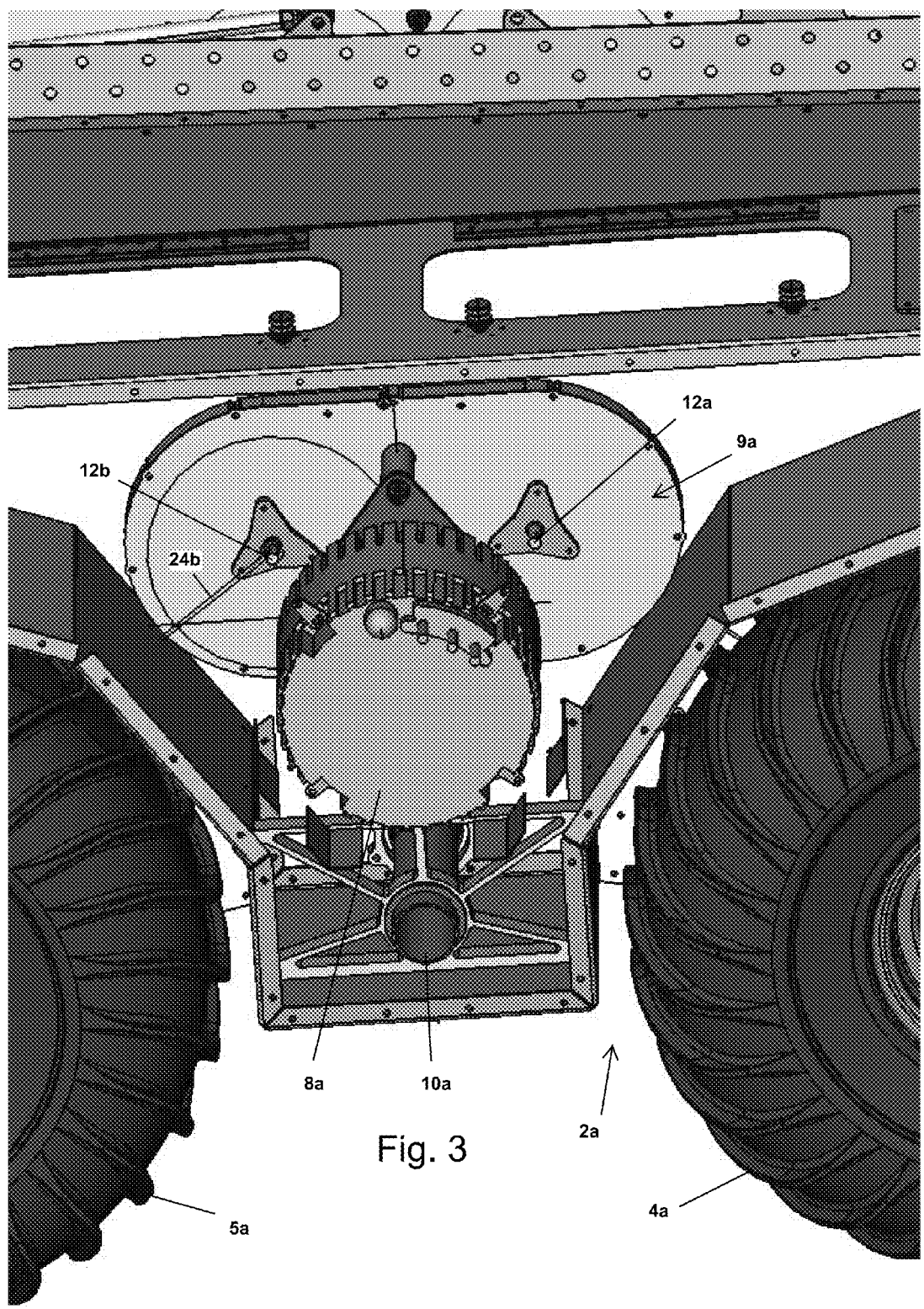
FIG. 3 is an enlarged perspective view of a portion of FIG. 2, further showing the drive unit.

Referring to FIGS. 2 and 3, the side access hatch 7a of drive unit 2a is removed to expose an interior of the right side drive unit 2a. An electric motor 8a is provided and connected to a gear drive assembly 9a. A pivot structure 10a is provided for pivotally attaching the drive unit 2a to the vehicle body 3 of the vehicle 1. The pivot structure 10a is at substantially the longitudinal midpoint of the drive unit 2a and is also beneath the electric motor and gear drive assembly 9a. In the embodiment shown, the pivot structure 10a comprises a pivot shaft receiving member in the shape of an aperture. The aperture is configured to receive a shaft 21 (not shown in FIGS. 2 and 3) with bushings, bearings or similar structure to allow pivoting movement of the vehicle drive unit 2a about a pivot axis passing through a center of the pivot structure 10a. In an alternative embodiment, the pivot structure 10a may comprise a stub shaft extending from the vehicle drive unit 2a inwardly of the vehicle to be received within a corresponding aperture on the vehicle body 3. Persons of skill in the art will readily recognize that various structures are available for pivotally attaching a vehicle drive unit 2a, 2b to the vehicle body 3.

Also shown is a second engagement structure 24b in a first position for maintaining engagement between a shaft of a second rotatable drive structure 12b, and other components of the gear drive assembly 9a. Although not shown, a similar engagement structure is provided for connection with the shaft of first rotatable drive structure 12a. The function of the second engagement structure 24b will be further described hereinafter.

Figure 4:
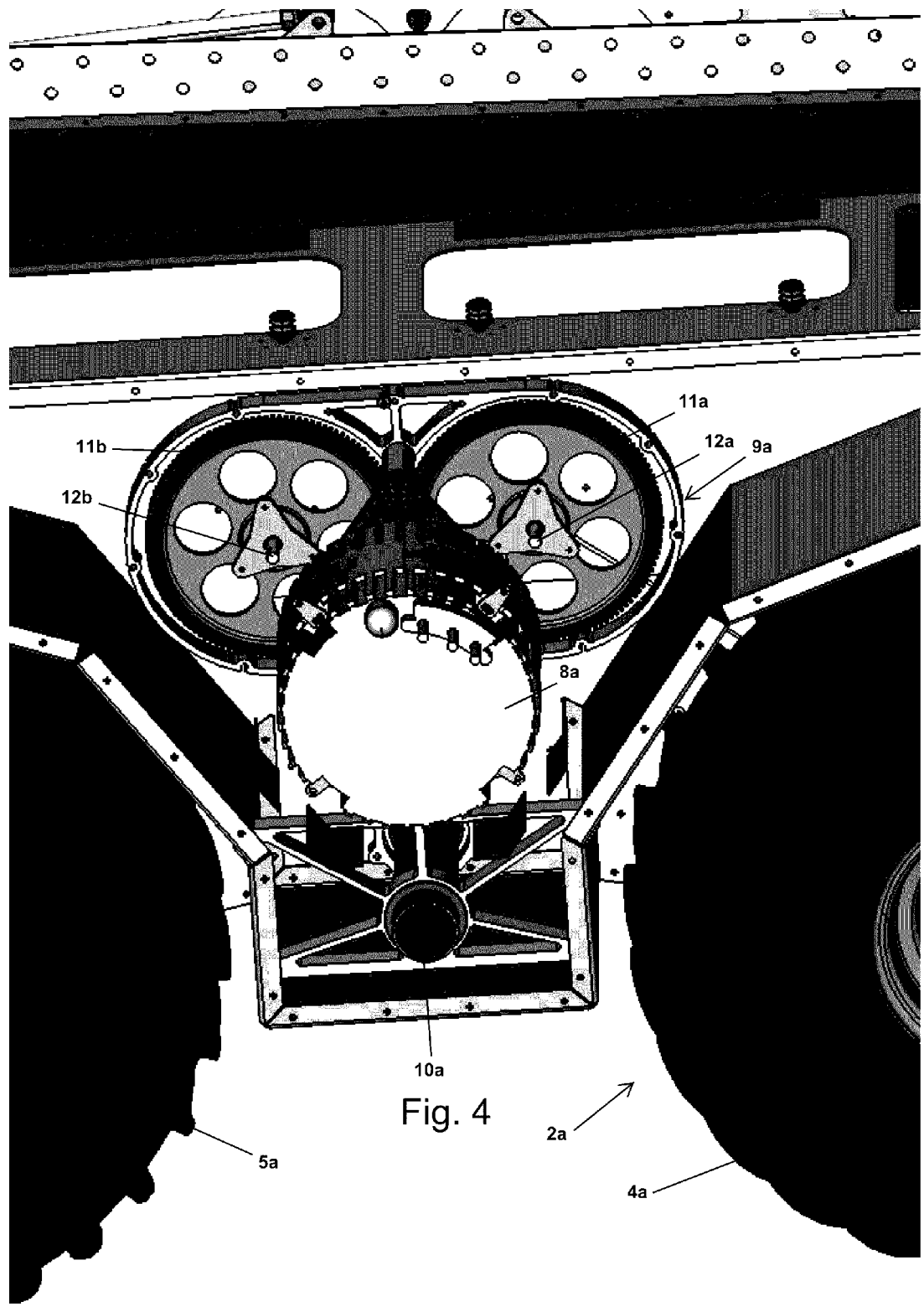
FIG. 4 is an enlarged perspective view of the drive unit of FIG. 2, exposing a portion of a gear drive of the drive unit.
Figure 5:
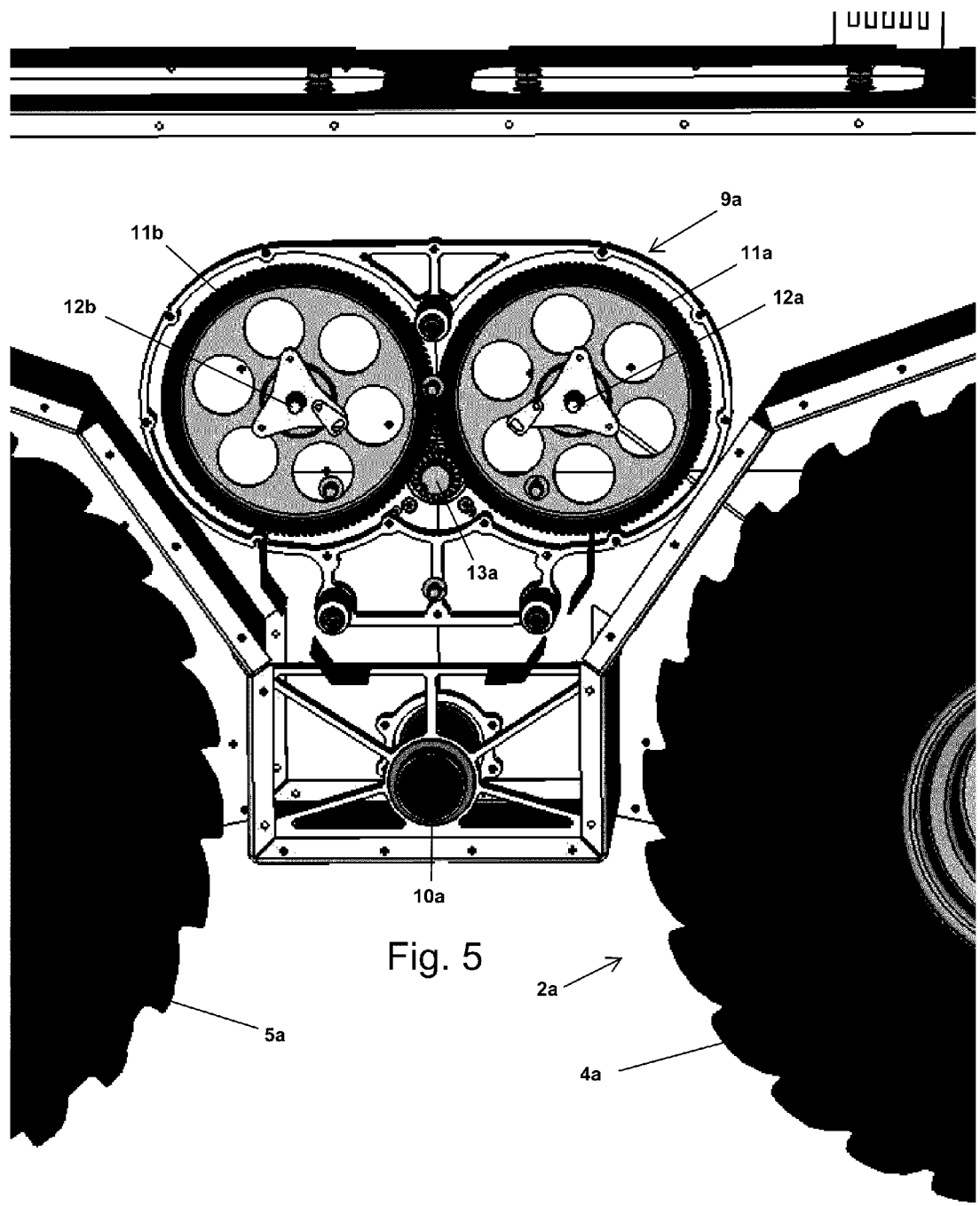
FIG. 5 is an enlarged perspective view of the drive unit of FIG. 2, further exposing the gear drive of the drive unit.

Turning now to FIG. 4, further features of the gear drive assembly 9a are shown. The gear drive assembly 9a comprises a first driven gear 11a and a second driven gear 11b. The shafts of the first and second rotatable drive structures 12a, 12b extend through a center of each respective driven gear 11a, 11b. Referring additionally to FIG. 5, wherein the electric motor 8a has been removed for clarity, a drive gear 13a that is powered by electric motor 8a is shown. The drive gear 13a and driven gears 11a, 11b form a planetary gear arrangement. It is desirable that the planetary gear arrangement comprises a drive gear 13a with a smaller diameter and lesser number of teeth than the driven gears 11a, 11b, which are themselves equal to one another in size and number of teeth. This provides increased torque while reducing the rotational speed of the driven gears 11a, 11b as compared with the electric motor 8a.

Figure 6:
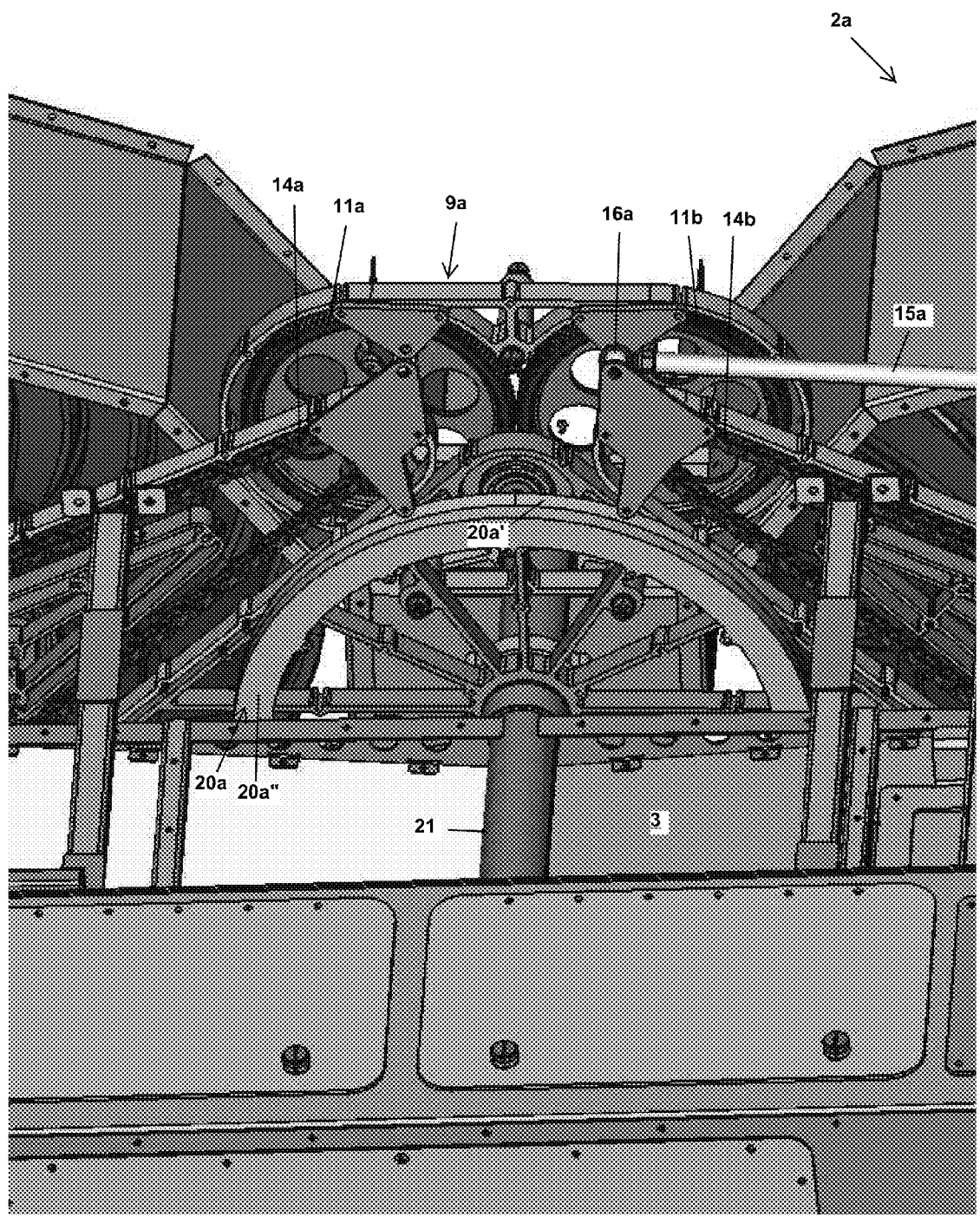
FIG. 6 is a perspective view from an opposite side of the drive unit of FIG. 2, showing drive chains.

FIG. 6 shows a rear of the gear drive assembly 9a wherein first and second rotatable drive structures 12a, 12b (hidden behind shields in this view) each engage a respective first and second endless tension structure 14a, 14b. In this embodiment, the rotatable drive structures 12a, 12b are drive sprockets and the endless tension structures, 14a, 14b are drive chains. In an alternative embodiment, the rotatable drive structures 12a, 12b are pulleys and the endless tension structures 14a, 14b are belts (which may be either toothed or not toothed). Each of the ground wheels 4a, 5a comprises a wheel sprocket (not shown) to which the endless tension structures 14a, 14b are connected. Rotation of the drive gear 13a in a first direction (as seen from the right side of the vehicle) causes a corresponding rotation of each driven gear 11a, 11b in a second direction. This in turn causes rotation of in the second direction of the rotatable drive structures 12a, 12b. This causes a corresponding movement in the same direction of the endless tension structures 14a, 14b, which in turn causes rotation in the same direction of the ground wheels 4a, 5a. The electric motor 8a may be operated at variable speed and in either a clockwise or counterclockwise direction. By altering the rotational speed and direction of the motors 8a, 8b of the drive units 2a, 2b, a skid steer arrangement is created for steering the vehicle 1 using differential speed control. This allows the vehicle to turn sharply on land or water by remotely controlling the speed and direction of the drive units 2a, 2b.

Figure 7:
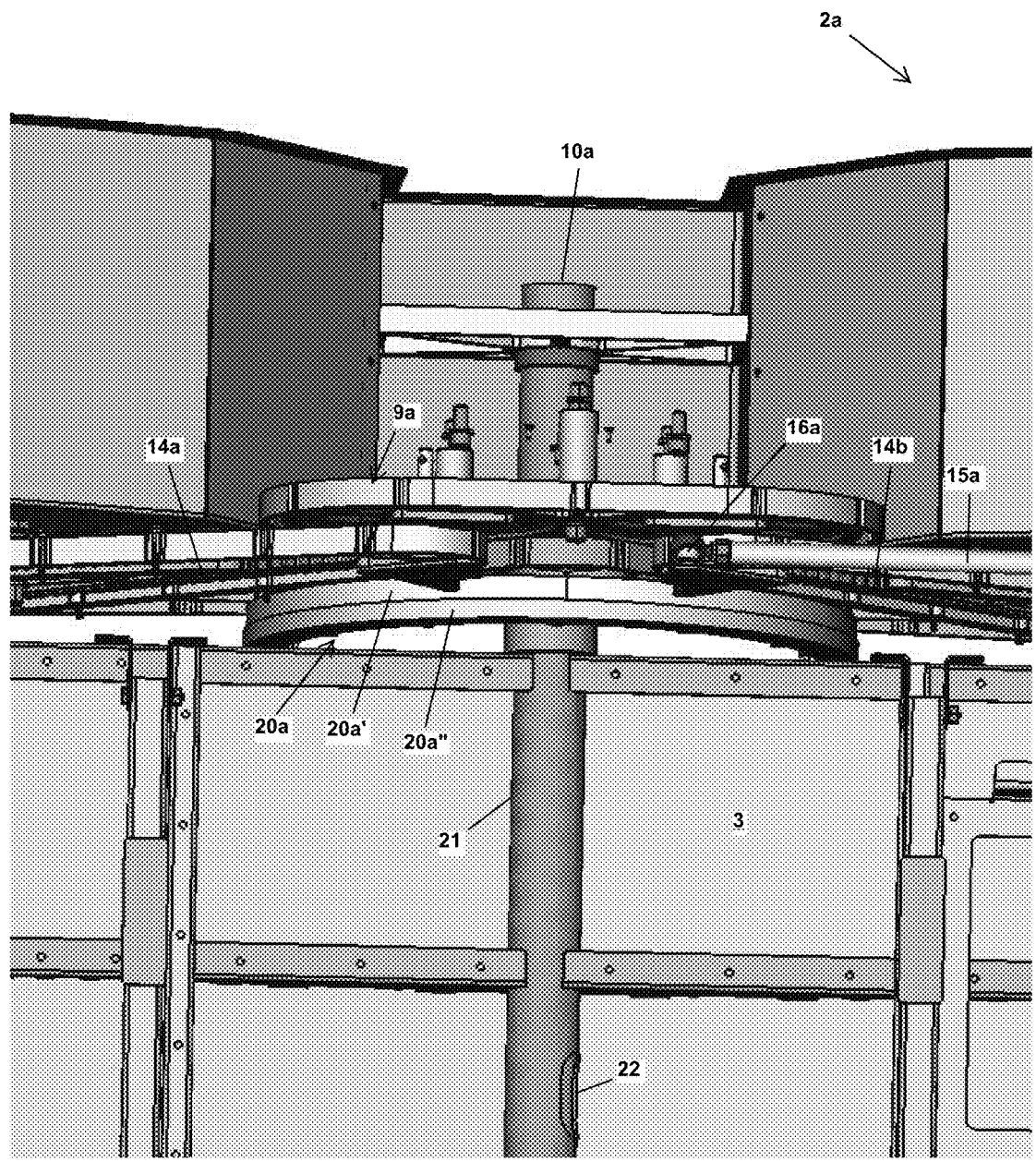
FIG. 7 is a perspective view from a top of the drive unit of FIG. 2.

Referring now additionally to FIG. 7, a drive unit bushing 20a is shown located between the vehicle body 3 and the drive unit 2a. The drive unit bushing 20a comprises an arcuate shape with a center aligned with the pivot axis passing through the pivot structure 10a. The drive unit bushing 20a is made from a dry lubricant material, such as an ultra-high molecular weight (UHMW) polyethylene, polytetrafluoroethylene (PTFE), or the like. The drive unit bushing 20a is provided in two portions 20a' and 20a". One of the portions is mounted to an interior facing side of the drive unit 2a and the other portion is mounted opposite thereto on the vehicle body 3. In an alternative embodiment, a single drive unit busing 20a may be fixedly mounted to either the vehicle body 3 or the drive unit 2a and spaced with close tolerance between those two structures. During operation, the drive unit bushing portion 20a' slidingly engages the drive unit busing portion 20a" during pivoting movement of the drive unit 2a in order to prevent deflection of the drive unit 2a relative to the pivot axis passing through the pivot structure 10a. Thus, the drive unit bushing 20a strengthens the connection between the drive unit 2a and the vehicle body 3, without the need for undue stiffening of the pivot structure 10a or the shaft 21 coupled thereto.

The shaft 21 engages with the corresponding portion of the pivot structure 10 a, as previously described. Due to the use of the drive bushing 20a, the shaft 21 is permitted to be hollow without compromising structural integrity of the vehicle 1. The hollow shaft 21 may therefore be used to provide a sealed connection between the drive unit 2a and the interior of the vehicle body 3. An electrical supply cable (not shown) passes through cable aperture 22 in the hollow shaft 21 and thereby is allowed to enter the interior of the drive unit 2a in a watertight manner. The drive unit 2a can thereby be powered from an electrical power source (such as batteries), located within the interior of the vehicle body 3. This lightens the weight of the drive unit 2a and simplifies charging of the vehicle 1 from a central location. However, in certain embodiments, it may be desirable to provide an electrical power source within the drive units 2a, 2b. The hollow shaft 21 and aperture 22 may be used to provide a passage for data cables, other electrical connections or even fluid conduits between the drive units 2a, 2b and the vehicle body 3.

Figure 8:
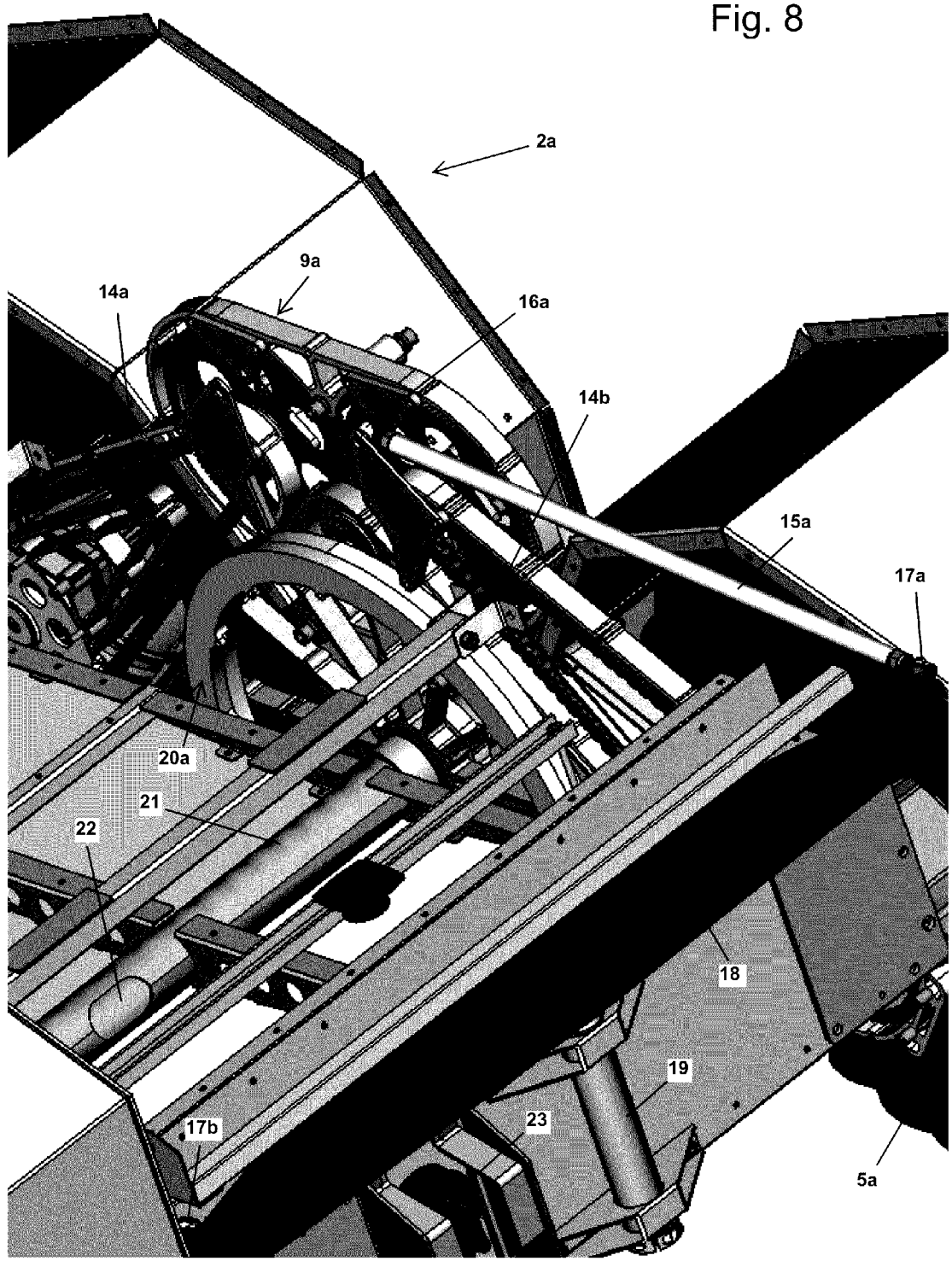
FIG. 8 is a perspective view from a rear of the drive unit of FIG. 2.
Figure 9:
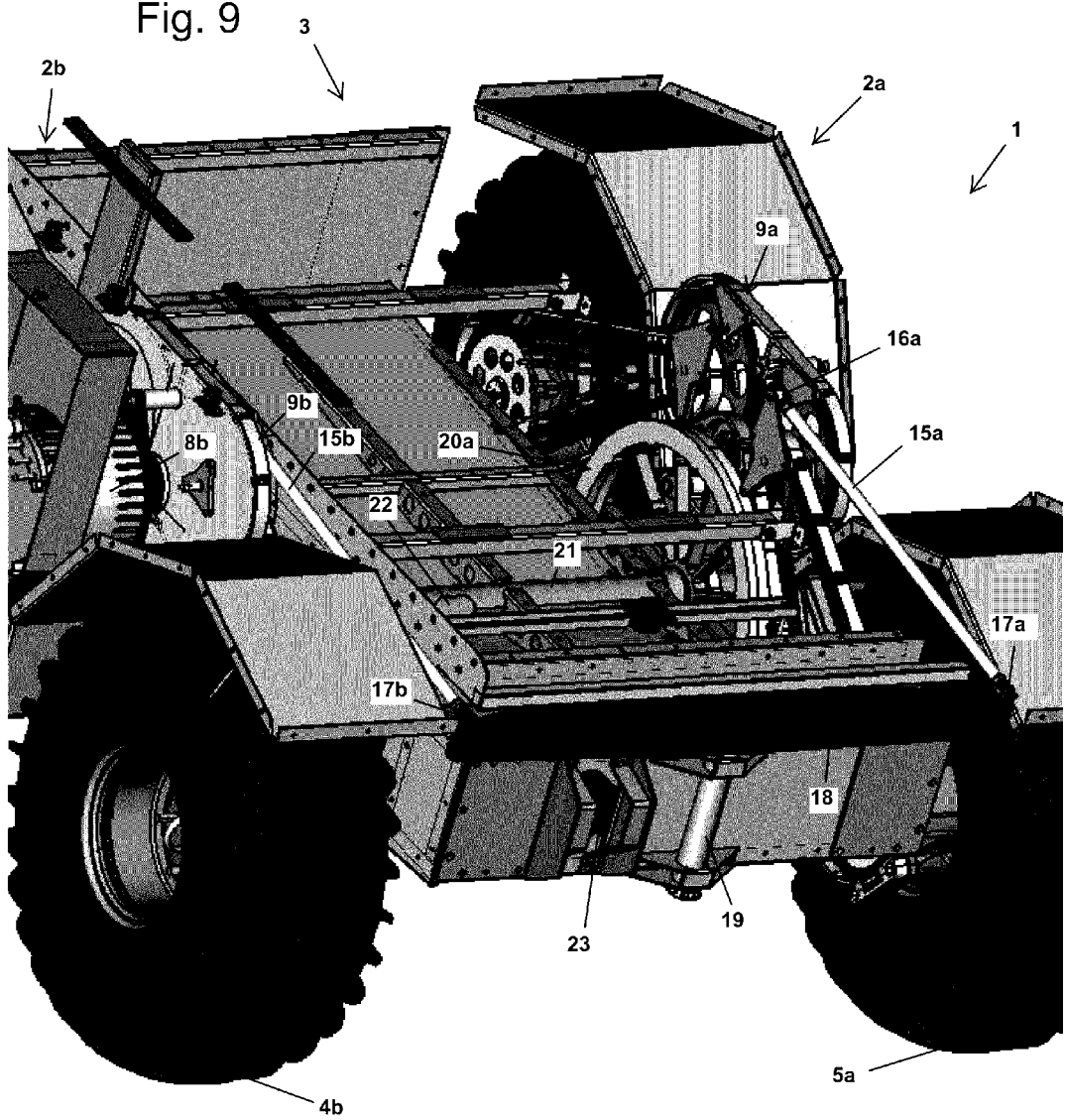
FIG. 9 is a perspective view from a rear of the vehicle of FIG. 1 showing features of a vehicle suspension system.

Referring to FIG. 8, the components of a vehicle suspension system can be seen. Right side suspension link 15a is pivotally attached at first end 16a to drive unit 2a at a position posterior to the midpoint of drive unit 2a (this is also posterior to pivot structure 10a, which is located at substantially the longitudinal midpoint of drive unit 2a). The second end 17a of right side suspension link 15a is pivotally attached to suspension cross member 18. The suspension cross member 18 is configured to pivot about a vertical pivot axis of suspension pivot structure 19, which is attached to a rear of the vehicle body 3 at substantially the transverse midpoint thereof. Referring additionally to FIG. 9, a corresponding left side suspension link 15b is attached at a first end to left side drive unit 2b (not shown in FIG. 9). A second end 17b of suspension link 15b, is attached to suspension cross member 18 opposite attachment 17a. Rotation of right side drive unit 2a in a clockwise direction (when seen from the right side of the vehicle 1) about the pivot axis passing through the pivot structure 10a causes the first end 16a of suspension link 15 a to move upwardly and toward the front of the vehicle 1. This in turn draws second end 17a of right side suspension link 15a toward the front of the vehicle 1, causing counterclockwise rotation (when seen from a top of vehicle 1) of suspension cross member 18 about the vertical pivot axis passing through suspension pivot structure 19. As a result, left side suspension link 15b is drawn towards a rear of the vehicle, thereby causing left side drive unit 2b to pivot clockwise (when viewed from a left side of the vehicle 1). Thus, the right side drive unit 2a and left side drive unit 2b pivot in opposite directions relative to one another about their respective pivot axes. This has the effect of distributing movements of the right side drive unit 2a to the left side drive unit 2b (and vice versa) in a manner that seeks to balance, or level, the vehicle body 3 when an obstacle is encountered on one side or another. However, when the same obstacle is encountered on both sides of the vehicle (for example, when simply travelling uphill), no levelling takes place and the front of the vehicle body 3 rigidly moves upwardly with the front of the drive units 2a, 2b to overcome the obstacle. Without such a suspension system, the vehicle body 3 could potentially impact the hill while the drive units 2a, 2b pivot in response to the hill. Thus, the suspension system provides more level operation of the vehicle over uneven terrain while permitting more uniform movement of the vehicle over even sloping terrain.

Figure 10:
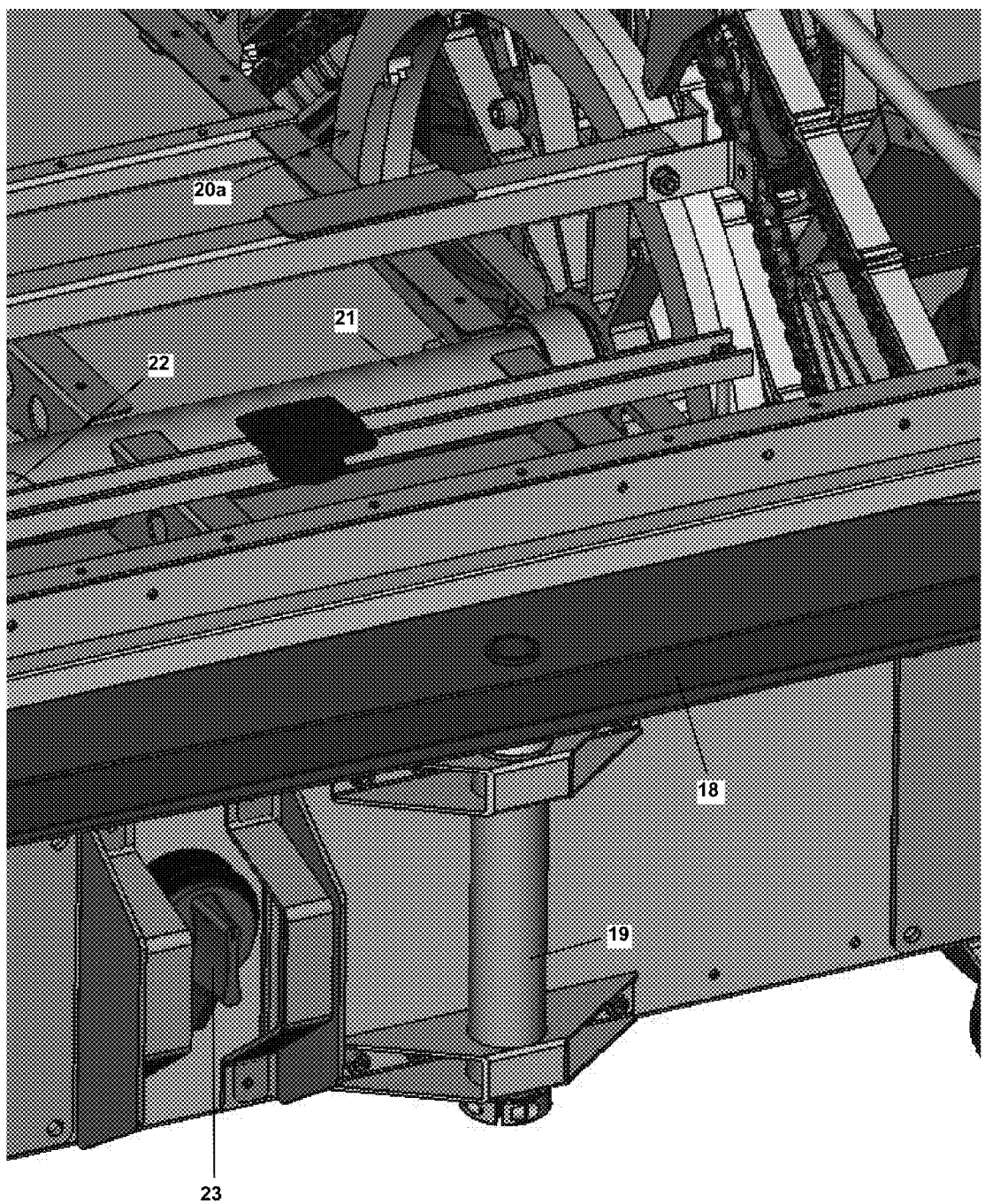
FIG. 10 is an enlarged perspective view of a portion of FIG. 9.

Referring additionally to FIG. 10, also provided on the rear of the vehicle body 3 is an electrical disconnect 23. The electrical disconnect 23 may be used to interrupt power flow from the electrical power supply (for example, one or more batteries, not shown), located within the vehicle body 3 to the electric motors 8a, 8b, located within drive units 2a, 2b. Similarly, a central charging point (not shown) can be provided on the vehicle body 3 to permit charging of the power supply from an exterior of the vehicle. Thus, with a single charging point and single electrical disconnect 23, the vehicle may be easily operated, charged, and made safe for maintenance taking place within the interior of the drive units 2a, 2b, or the interior vehicle body 3.

Figure 12:
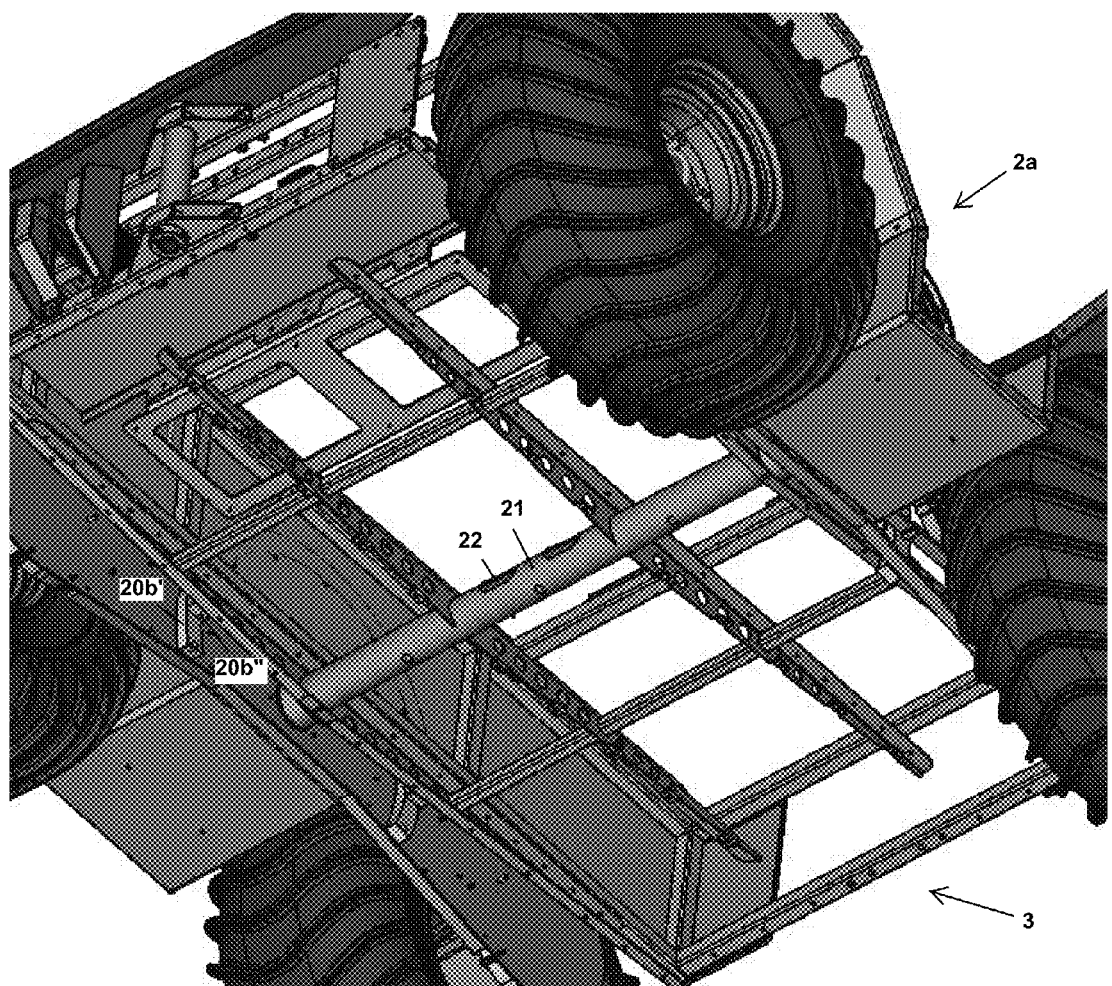
FIG. 12 is a perspective view from a bottom of the vehicle of FIG. 1 with features of the bottom of the vehicle exposed.

Referring to FIG. 12, an underside of vehicle 1 is shown. Bottom coverings of the vehicle body 3 have been removed for clarity. As can readily be seen, the hollow shaft 21 is located within the interior of the vehicle body 3, at a point lower than the front or rear ends of the vehicle body 3. Thus, the underside of the vehicle body 3 is sloped downwardly from each end toward the longitudinal midpoint of the vehicle body. This facilitates movement of the vehicle body up and over obstacles, when traveling in either direction, where impact with the obstacle may occur. It also facilitates operation of the vehicle on water, as the relatively elevated front and rear ends of the underside of the vehicle body 3 serve to ride up and over any bow wake created as the vehicle moves through water. Also seen in FIG. 12 is the tread pattern and configuration of the wheels 4a, 4b, 5a, 5b. This tread configuration is advantageous in that it allows the vehicle to be propelled on water by the wheels and also on land. Differential rotational speed of the wheels 4a, 4b, 5a, 5b can be used to steer the vehicle on water or on land. The drive unit bushing 20b is also shown attached to an interior surface of the left side drive unit 2b. A drive unit bushing portion 20b' is provided attached to the interior facing surface of the left side drive unit 2b and the corresponding drive unit bushing portion 20b" is provided attached to an outward facing (leftward facing) surface of the vehicle body 3 for sliding engagement of the two drive bushings with one another upon pivoting movement of the drive unit 2b.

The vehicle body 3 is watertight and is desirably configured to allow the vehicle 1 to float by virtue of fluid displacement. Similarly, the drive units 2a, 2b are watertight. In some embodiments, the drive units 2a, 2b have sufficient displacement by virtue of the sealed housings 6a, 6b and ground wheels 4a, 4b, 5a, 5b to float by themselves. In other embodiments, sufficient displacement is provided by the vehicle body 3 that the vehicle can float without the drive units 2a, 2b themselves being floatable. In still other embodiments, displacement of the vehicle body 3 is insufficient for flotation and flotation is provided by the drive units 2a, 2b. In still other embodiments, insufficient displacement for flotation is provided by either the drive units 2a, 2b or the vehicle body 3 and external sources of flotation are employed. These may comprise inflatable bladders, fixed flotation elements (for example, styrofoam elements), additional displacement elements (for example, pontoons) or any other suitable structure.

Figure 11:
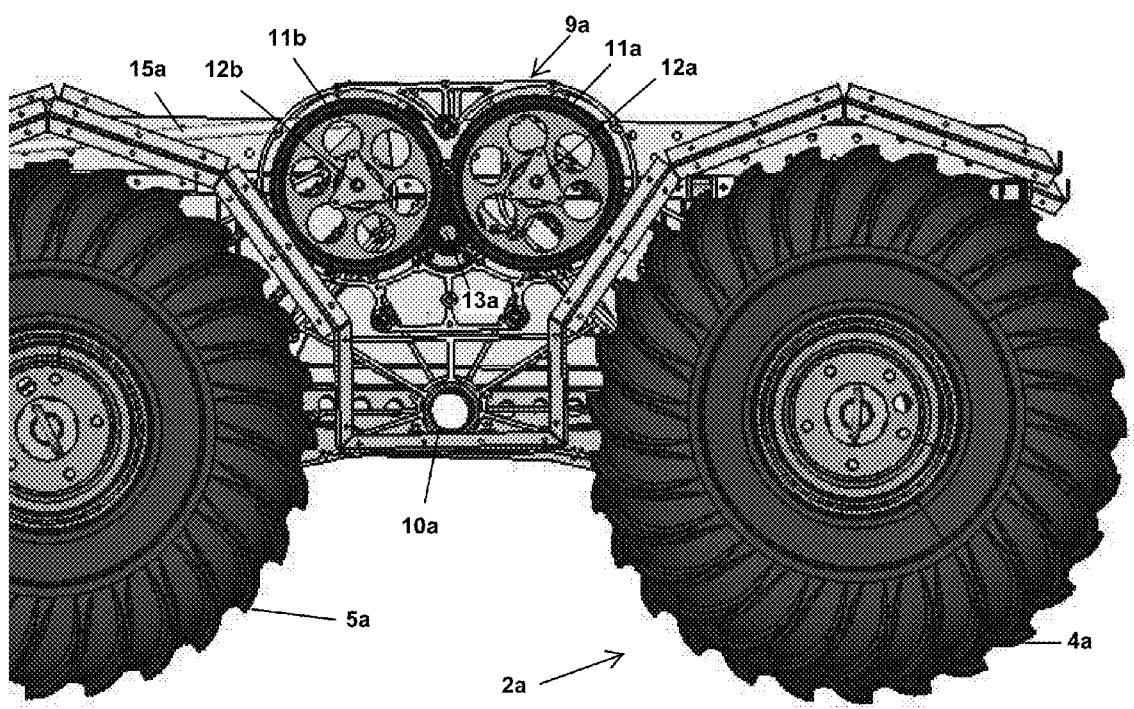
FIG. 11 is a side view of the vehicle of FIG. 1 with various features of the drive unit and vehicle exposed.
Figure 13:
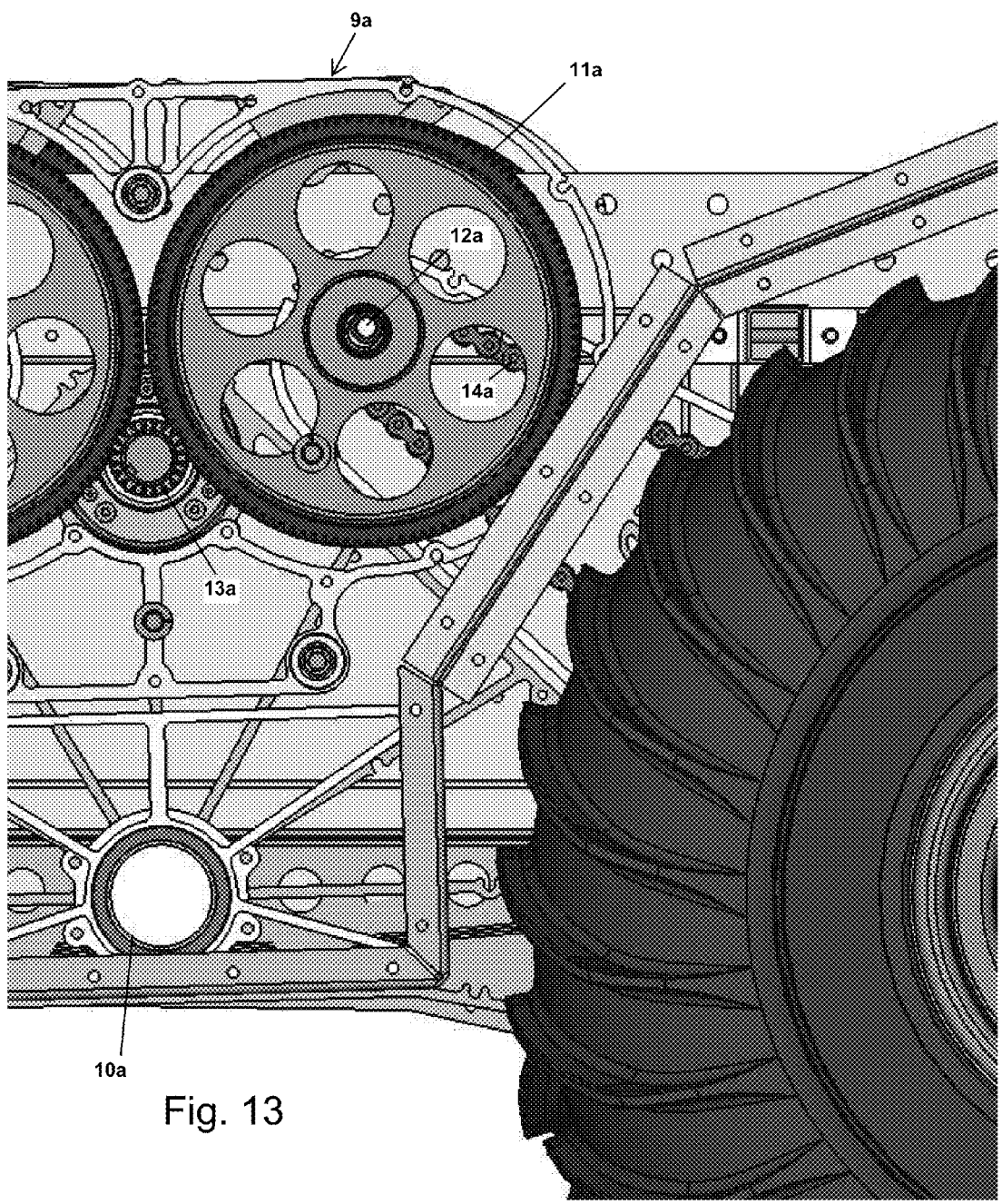
FIG. 13 is an enlarged side view of a portion of FIG. 11.

Referring to FIGS. 11 and 13, it can be seen at the pivot structure 10a is open and the shaft 21 is hollow, passing all the way from one side to the other of the vehicle body 3. The shaft 21 need not pass from one side to the other, but could simply end as a stub shaft somewhere within the interior of the vehicle body 3. Turning specifically to FIG. 13, a shaft of the first rotatable drive structure 12a passes through a center of first driven gear 11a; however, the rotational axis of the rotatable drive structure 12a is not coaxial with the rotational axis of the first driven gear 11a. Despite the fact that these axes are not aligned, an exterior surface of the shaft of rotatable drive structure 12a is frictionally engaged within an interior surface of the enlarged opening of the first driven gear 11a. Upon rotation of the first driven gear 11a in a given direction, the first rotatable drive structure 12a is caused to also rotate in the same direction. In place of frictional engagement between the first rotatable drive structure 12a and the first driven gear 11a, any suitable means of interaction may be provided (for example, meshing gear teeth). The axis of rotation of the first rotatable drive structure 12a is translatable toward the axis of rotation of the first driven gear 11a in the event that a first engagement structure (not shown) is moved from a first position to a second position.

Figure 14:
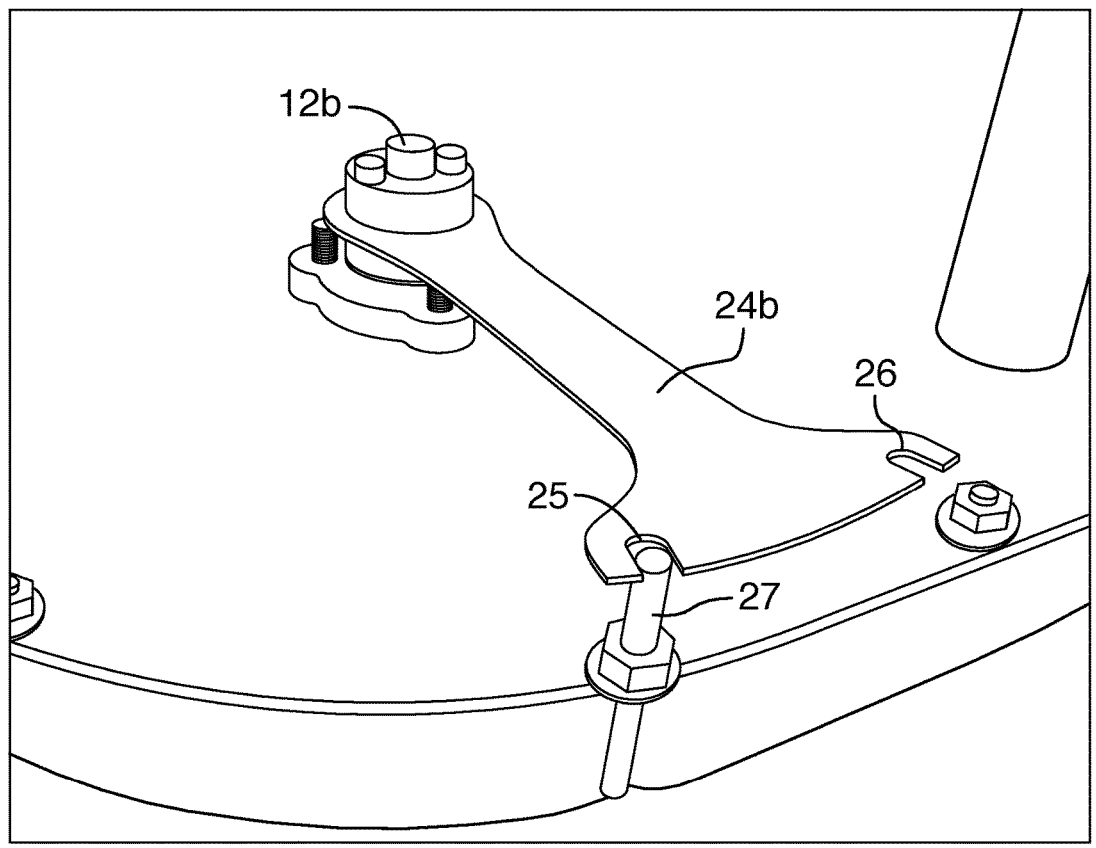
FIG. 14 is a perspective view of a drive dis-engaging level of the vehicle.

Referring additionally to FIG. 14, a corresponding second engagement structure 24b that functions in a similar manner is shown in the first position, whereby the second rotatable drive structure 12b and second driven gear 11b are engaged with one another. This first position is denoted by engagement of notch 25 with post 27. Due to flexibility of the engagement structure 24b, the notch 25 may be elevated relative to the post 27 to allow the engagement structure 24b to be rotated in a clockwise direction until the second notch 26 is aligned with post 27. The second rotatable drive structure 12b moves in an eccentric fashion until the rotatable drive structure is no longer engaged with the second driven gear 11b. Thus, rotation of the ground wheel 5a causes rotation of second rotatable drive structure 12b via endless tension member 14b, but the rotation is not transmitted to the second driven gear 11b. This isolates electric motor 8a from being inadvertently driven during towing or other externally induced movement of the vehicle 1. This makes the vehicle easier to tow or push, prevents inadvertent wear of the gear drive assembly 9a, of the electric motor 8a, and inadvertent back charging of the electrical power supply, which could lead to unintended heat buildup. As previously mentioned, similar engagement structure is provided for the first rotatable drive member 12a and first driven gear 11a. Corresponding structures are also provided on the left side drive unit 2b.

The novel features of the present invention will become apparent to those of skill in the art upon examination of this disclosure as a whole. It should be understood, however, that the scope of the claims should not be limited by the preferred embodiments set forth herein, but should be given the broadest interpretation consistent with the specification as a whole. The inventors intend to claim all disclosed features and sub-combinations of the invention.

The invention claimed is:

1. A vehicle drive unit comprising:
   a pair of longitudinally aligned and longitudinally spaced apart ground wheels;
   an electric motor operatively coupled to the pair of wheels by a gear drive assembly, the gear drive assembly comprising a planetary gear arrangement having a single drive gear and a pair of driven gears corresponding to the pair of ground wheels; and,
   a housing enclosing the gear drive and motor to which the pair of wheels is operatively mounted.

2. The vehicle drive unit of claim 1, wherein the drive unit comprises structure configured to pivotally mount the drive unit to a land vehicle.

3. The vehicle drive unit of claim 2, wherein the structure configured to pivotally mount the drive unit to the land vehicle is located on the housing between the pair of wheels.

4. The vehicle drive unit of claim 2, wherein the structure configured to pivotally mount the drive unit to the land vehicle is located on the housing beneath the gear drive assembly.

5. The vehicle drive unit of claim 1, wherein the housing is water-tight and wherein the drive unit is capable of floating.

6. The vehicle drive unit of claim 1, wherein the ground wheels are configured with treads suitable for propelling the drive unit on land as well as on water.

7. The vehicle drive unit of claim 1, wherein the drive unit comprises structure suitable for connection to an electrical power supply.

8. The vehicle drive unit of claim 1, wherein each drive gear is coupled to its respective ground wheel by a rotatable drive structure configured to interact with an endless tension structure.

9. The vehicle drive unit of claim 8, wherein the rotatable drive structure comprises a drive sprocket and wherein the endless tension structure comprises a drive chain.

10. The vehicle drive unit of claim 8, wherein the rotatable drive structure comprises a drive pulley and wherein the endless tension structure comprises a drive belt.

11. The vehicle drive unit of claim 8, wherein the rotatable drive structure has an axis of rotation that is not co-axially aligned with an axis of rotation of the drive gear when the gear drive assembly is in operation.

12. The vehicle drive unit of claim 8, wherein the gear drive assembly comprises an engagement structure for maintaining engagement between the rotatable drive structure and the drive gear when in a first position and for permitting disengagement of the rotatable drive structure from the drive gear when in a second position.

13. The vehicle drive unit of claim 12, wherein the engagement structure is moveable between the first position and the second position by an operator of the drive unit.

14. A land vehicle comprising:
   a vehicle body;
   a pair of drive units pivotally attached on opposite sides of the vehicle body, each drive unit comprising a pair of longitudinally aligned and longitudinally spaced apart ground wheels, an electric motor operatively coupled to the pair of wheels by a gear drive assembly, a housing enclosing the gear drive and motor to which the pair of wheels is operatively mounted, and structure configured to pivotally mount the drive unit to the vehicle located on the housing between the pair of wheels;
   an electrical power supply;
   an electrical supply cable passing from each drive unit to the vehicle body; and,
   remote control structure for the vehicle configured to permit differential operation of the drive units,
   wherein the structure configured to pivotally mount each drive unit to the vehicle is hollow and contains the electrical supply cable.

15. The land vehicle of claim 14, wherein the vehicle body is water-tight and configured to float.

16. The land vehicle of claim 15, wherein the vehicle is amphibious.

17. The land vehicle of claim 14, wherein the vehicle is remotely controllable via a radio transceiver.

18. The land vehicle of claim 17, wherein there is a radio transceiver for each vehicle drive unit.

19. The land vehicle of claim 14, wherein the electrical power supply is located in the vehicle body and comprises a battery.

20. The land vehicle of claim 14, wherein there is a disconnect switch on the vehicle body for interrupting power to both drive units.

21. A land vehicle comprising:
   a vehicle body;
   a pair of drive units pivotally attached on opposite sides of the vehicle body, each drive unit comprising a pair of longitudinally aligned and longitudinally spaced apart ground wheels, an electric motor operatively coupled to the pair of wheels by a gear drive assembly, a housing enclosing the gear drive and motor to which the pair of wheels is operatively mounted, and structure configured to pivotally mount the drive unit to the vehicle located on the housing between the pair of wheels;
   an electrical power supply;
   remote control structure for the vehicle configured to permit differential operation of the drive units; and,
   a vehicle suspension configured to cause the vehicle drive units to pivotally move in opposite directions to one another, the vehicle suspension comprising a pair of suspension links, each link being pivotally attached at one end to a respective drive unit and at an opposite end to a suspension cross member that is pivotally mounted to the vehicle body for movement about a central vertical pivot axis, the vehicle suspension configured such that pivoting movement of one drive unit in a first direction about the structure configured to pivotally mount the drive unit to the vehicle causes the other drive unit to move in a second direction opposite the first direction via pivoting movement of the suspension cross member about the central vertical pivot axis.

22. A land vehicle comprising:
a vehicle body;
a pair of drive units pivotally attached on opposite sides of the vehicle body, each drive unit comprising a pair of longitudinally aligned and longitudinally spaced apart ground wheels, an electric motor operatively coupled to the pair of wheels by a gear drive assembly, a housing enclosing the gear drive and motor to which the pair of wheels is operatively mounted, and structure configured to pivotally mount the drive unit to the vehicle located on the housing between the pair of wheels;
a drive unit bushing between each drive unit and the vehicle body, each drive unit bushing configured to engage both the vehicle body and the drive unit during operation of the vehicle;
an electrical power supply; and,
remote control structure for the vehicle configured to permit differential operation of the drive units.

23. The land vehicle of claim 22, wherein the drive unit bushing comprises at least an arcuately shaped portion concentric with the structure configured to pivotally mount the drive unit to the vehicle and is configured to slidingly engage one or more of the vehicle body and the drive unit during operation of the vehicle.

* * * * *